United States Patent
Hamilton

(10) Patent No.: US 7,085,944 B1
(45) Date of Patent: Aug. 1, 2006

(54) POWER MANAGEMENT BY TRANSMITTING SINGLE MULTIPLEXED SIGNAL TO MULTIPLE SYSTEM COMPONENTS TO CHANGE SETTINGS OF INTERNAL PERFORMANCE REGISTERS IN RESPONSE TO CHANGE IN POWER SOURCE

(75) Inventor: Tony Hamilton, Durham, NC (US)

(73) Assignee: Intel Corporation, Santa Clara, CA (US)

( * ) Notice: Subject to any disclaimer, the term of this patent is extended or adjusted under 35 U.S.C. 154(b) by 604 days.

(21) Appl. No.: 09/677,261

(22) Filed: Sep. 30, 2000

(51) Int. Cl.
*G06F 1/26* (2006.01)

(52) U.S. Cl. .................. 713/320; 713/322; 713/340

(58) Field of Classification Search ............. 713/322, 713/340, 320; 345/520
See application file for complete search history.

(56) References Cited

U.S. PATENT DOCUMENTS

| | | | |
|---|---|---|---|
| 5,021,679 A | | 6/1991 | Fairbanks et al. |
| 5,153,535 A | | 10/1992 | Fairbanks et al. |
| 5,175,706 A | | 12/1992 | Edme |
| 5,307,003 A | | 4/1994 | Fairbanks et al. |
| 5,457,407 A | * | 10/1995 | Shu et al. ................ 326/30 |
| 5,627,412 A | | 5/1997 | Beard |
| 5,752,011 A | | 5/1998 | Thomas et al. |
| 5,760,636 A | | 6/1998 | Noble et al. |
| 5,787,294 A | * | 7/1998 | Evoy ...................... 713/320 |
| 5,974,557 A | | 10/1999 | Thomas et al. |
| 6,035,407 A | | 3/2000 | Gebara et al. |
| 6,040,845 A | * | 3/2000 | Melo et al. ............... 345/520 |
| 6,085,330 A | | 7/2000 | Hewitt et al. |
| 6,118,306 A | | 9/2000 | Orton et al. |
| 6,216,235 B1 | | 4/2001 | Thomas et al. |
| 6,266,776 B1 | * | 7/2001 | Sakai ...................... 713/300 |
| 6,311,281 B1 | | 10/2001 | Pole et al. |
| 6,418,535 B1 | * | 7/2002 | Kulakowski et al. ...... 713/320 |
| 6,460,106 B1 | * | 10/2002 | Stufflebeam .............. 710/304 |
| 6,487,668 B1 | | 11/2002 | Thomas et al. |
| 6,564,329 B1 | * | 5/2003 | Cheung et al. ............ 713/322 |
| 6,715,089 B1 | | 3/2004 | Zdravkovic |

FOREIGN PATENT DOCUMENTS

JP 11015658 A 1/1999
WO PCT US/01/30254 1/2003

OTHER PUBLICATIONS

"Power Management Clock Change for 603 Processor", IBM Technical Disclosure Bulletin, Dec. 1, 1995, US, pp. 325-328.

* cited by examiner

*Primary Examiner*—Thomas Lee
*Assistant Examiner*—Albert Wang
(74) *Attorney, Agent, or Firm*—Blakely, Sokoloff, Taylor & Zafman LLP

(57) ABSTRACT

A method and apparatus to detect a power change in a system (e.g. computer) and to automatically adjust, in response to the power change, the performance states (e.g. supply voltages, clock frequencies and buffer strengths) of a plurality of system components (e.g. buses). The apparatus includes a detector and a controller.

18 Claims, 2 Drawing Sheets

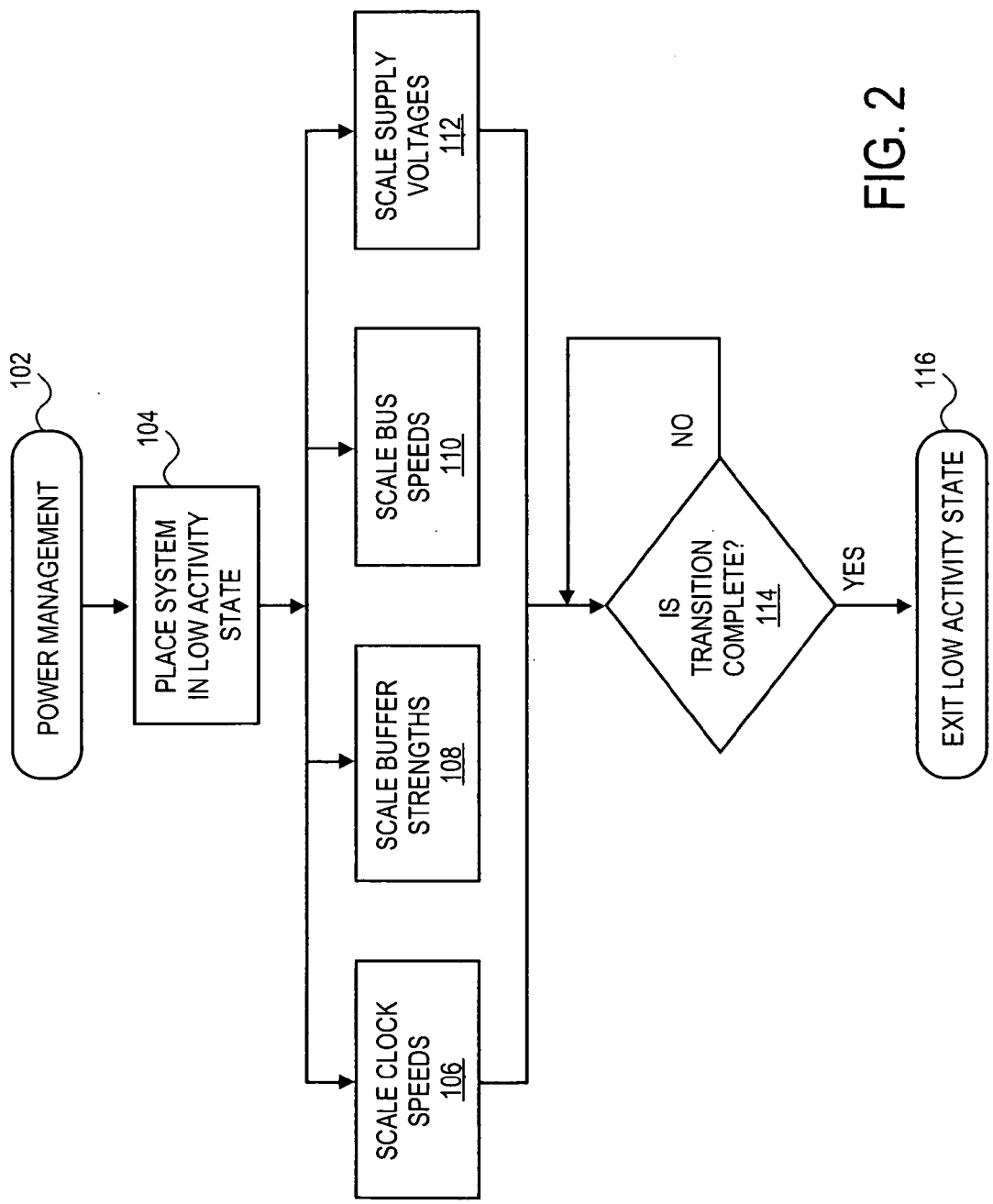

US 7,085,944 B1

POWER MANAGEMENT BY TRANSMITTING SINGLE MULTIPLEXED SIGNAL TO MULTIPLE SYSTEM COMPONENTS TO CHANGE SETTINGS OF INTERNAL PERFORMANCE REGISTERS IN RESPONSE TO CHANGE IN POWER SOURCE

FIELD OF THE INVENTION

This invention relates to computers. Specifically, this invention relates to providing dynamical scalability to portable computers, including notebook computers.

BACKGROUND OF THE INVENTION

Portable systems, such as notebook computers, have steadily become more powerful with improved technology. Notebook computers are popular because they are mobile and can be used in remote places such as on airplanes. They can also be used in homes and offices with accesses to AC outlets.

As the processor and bus speeds steadily rise and the graphics performances steadily improve, the power dissipation of the system components to support them also increases. Power dissipation is generally not an issue when the notebook computer is connected to an external power source such as an AC outlet because the power supply is infinite. When the notebook computer relies on a battery as its power source, however, power dissipation becomes important because the battery has a finite life span after which it needs to be recharged.

It can be inconvenient and annoying for a user to run out of battery charge while he is using his notebook computer, especially if he has no immediate means to recharge the battery. Therefore, maximizing the battery's life span is always desirable to provide the user with at least a reasonable amount of time to use his notebook computer in a remote place such as on an airplane.

One solution to maximize battery life is offered by the Geyserville™ processor technology developed by the Intel Corporation located in Santa Clara, Calif. Geyserville extends the battery life by providing a dynamically scalable processor performance. Dynamic scaling refers to automatically adjusting the processor's performance state (processor's clock frequency and supply voltage) depending on the power source. Power dissipation of the processor is proportional to its clock frequency and to the square of its supply voltage. By slowing down the processor's clock and reducing the its supply voltage when the portable system is relying on the battery for its power source, the Geyserville technology dramatically reduces the processor's power dissipation.

The Geyserville solution is only a partial one however, and there is a further need to increase battery life span.

BRIEF DESCRIPTION OF THE DRAWINGS

The present invention is illustrated by way of example and not limitation in the figures of the accompanying drawings, in which like references indicate similar elements and in which:

FIG. 2 is a flow diagram of the method according to one embodiment.

DETAILED DESCRIPTION

Figure 1:
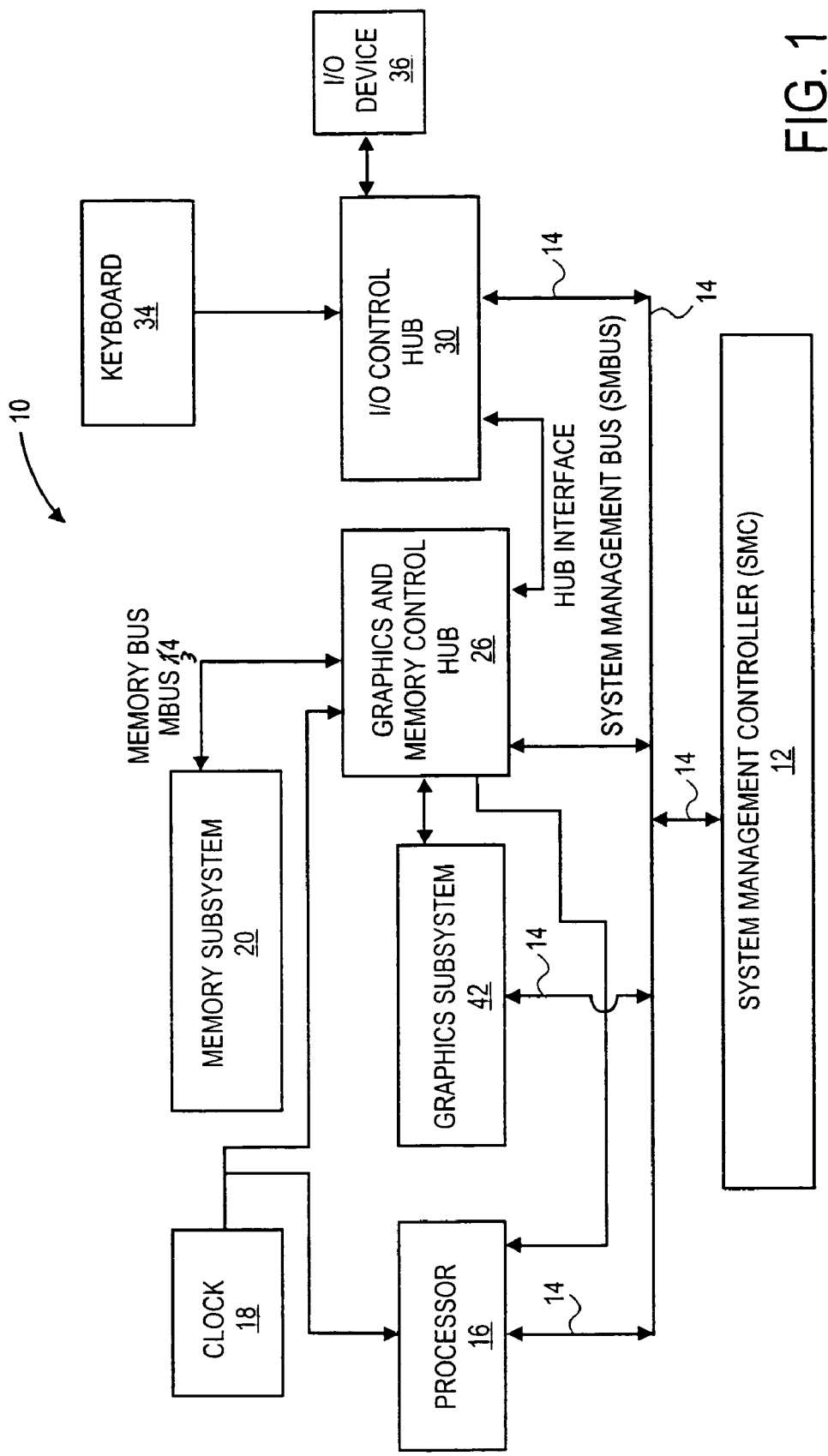
FIG. 1 is a block diagram of a system in which the method according to one embodiment is implemented.

The present invention extends the dynamic scalability of the Geyserville technology beyond the processor. In one embodiment, system buses and other system components are dynamically scaled.

Scalability refers to increasing or decreasing certain attributes of a system's components such as clock frequencies, supply voltages, graphics performances, buffer strengths, and others. Dynamic scalability refers to scalability upon occurrence of a predetermined event, such as a power management event, without user intervention. In the ensuing description, each attribute is described in relation to two performance states (high level and low level) between which scaling is performed. It is contemplated, however, that each attribute can be scaled among multiple performance states.

FIG. 1 is a block diagram of a system 10 in which the method according to one embodiment of the present invention is implemented. In one embodiment, the system 10 is a computer. In other embodiments, system 10 can be a portable computer, a hand-held electronic device, and the like. In one embodiment, the computer 10 includes a System Management Controller (SMC) 12. The SMC 12 controls the transfer of data between the chipsets and the peripheral devices such as the processor 16, the Input Output Control Hub (I/O CH) 30, the Graphics Memory Control Hub (GMCH) 26, the keyboard 34, and the Input Output Device (I/O Device) 36.

In one embodiment, the SMC 12 is formed of one or more layers including, for example, software, firmware, and hardware. In one embodiment, the SMC 12 is connected to the chipsets and the peripheral devices by a first bus 14. In one embodiment, the first bus is referred to as the System Management Bus (SMBUS). In one embodiment, the chipsets include the GMCH 26 and the I/O CH 30. In one embodiment, the chipsets provide the electronic interfaces between the processor 16, the memory sub system 20, and the graphics sub system 42.

A bus is a collection of wires through which data is transferred from one part of a computer to another. Two characteristics of every bus are its width and its clock speed. The width determines how much data can be transmitted at one time. For example, a 16-bit bus can transfer 16 bits of data, whereas a 32-bit bus can transmit 32 bits of data. The clock speed is measured in megahertz (MHZ) and indicates how fast the data is transferred. A higher bus clock speed requires a higher minimum bus supply voltage. If the data transmission load on the SMBUS 14 is low, for example, because of low activity, lowering the clock speed and the supply voltage of the SMBUS 14 can reduce the power dissipation of the SMBUS 14.

As stated previously, reducing the power dissipation is generally not an issue when the computer 10 is connected to an external power source such as an AC outlet because the power supply is infinite. When the computer 10 is connected to a battery, however, reducing the power dissipation provides a benefit in the form of increased battery longevity.

In one embodiment, the computer 10 includes an additional bus such as the Memory Bus (MBUS) 34. In one embodiment, the MBUS 34 connects the memory sub system 20 to the GMCH 26. In one embodiment, the MBUS 34 operates at a higher speed than the SMBUS 14.

FIG. 2 is a flow diagram of the method according to one embodiment to be implemented in the computer 10 of FIG. 1.

In one embodiment, the SMC 12 detects the predetermined power management event (at 102). In one embodiment, the power management event includes a change in the power source of the computer 10 from an external source to a battery or vice versa. Upon detecting the power management event, the SMC 12 automatically places the computer in a Low Activity State (at 104). In one embodiment, the Low Activity State includes the Deep Sleep Power Management State (ACPI Specification C3 State). ACPI Specification stands for Advanced Configuration and Power Interface Specification, Revision 2.0, published on Jul. 27, 2000. During the C3 State, the clock generator 18 input to the components is disabled. That stops all logical functions processing inside the components but allows the internal settings to be maintained (e.g., values stored in registers and caches).

Following, the SMC 12 utilizes a management command structure and an algorithm to send multiplexed commands by utilizing the SMBUS 14 to perform various scaling operations (at 106, 108, 110 and 112). Sending multiplexed commands refers to combining the command signals into one a signal for transmission to the multiple components. Two communications devices are used for multiplexing: a multiplexor residing in the SMC 12 to combine the command signals into one signal and a demultiplexor residing in the component unit to separate the command signal pertaining to that component. Sending commands in a multiplexed fashion allows for the scaling operations (at 106–112) to occur simultaneously. In an alternative embodiment, the SMC 12 sends individual commands instead of multiplexed commands.

In one embodiment, performing a scaling operation includes changing the setting of a performance register inside the component. The algorithm contains the predetermined performance register settings and is automatically executed by the SMC 12 upon the occurrence of the power management event. In one embodiment, the algorithm has two predetermined settings (high level and low level) for each of the attributes to be scaled. In other embodiments, programmable devices such as fuse banks and non-volatile memory are used instead of the performance registers.

In one embodiment, the frequencies of the processor clock, the memory sub system clock, and the clock generator 18 are scaled between a high level and a low level (at 106) depending on the power management event. In one embodiment, the high level is 133 MHZ and the low level is 100 MHZ. The clock frequencies are set to the low level if the computer 10 power source was changed from the outside source to the battery. The clock speeds are set to the high level if the computer 10 power source was changed from the battery to the outside source.

In one embodiment, the setting of the performance register represents bus fraction data specifying the ratio of the component's clock frequency to the clock generator 18 output.

In one embodiment, the buffer strength of the chipset 40 is scaled between a high level and a low level (at 108). The chipset buffers drive the SMBUS 14 and the MBUS 34 by reading data from and writing data onto the buses 14 and 34. The chipset buffers act as holding areas, enabling the processor 16 to manipulate data before transferring it to the buses 14 and 34. The chipset buffers compensate for the speed differences between the processor 16 and the buses 14 and 34. Buffer strength can be scaled between a high level and a low level, based on the data tranmission load and clock frequencies of the buses 14 and 34. A higher buffer strength requires a higher minimum bus supply voltage. By scaling the buffer strength to the low level when the computer 10 is using the battery as its power source, power dissipation is reduced. In one embodiment, the buses speeds are scaled (at 110) between a high level and a low level. In one embodiment, the high level is 133 MHZ and the low level is 100 MHZ. In another embodiment, the high level is 450 MHZ and the low level is 350 MHZ. The bus speeds of the SMBUS 14 and the MBUS 34 are scaled by scaling their respective clock frequencies.

A minimum level of supply voltage is required to support the components clock frequencies and buffer strengths. In the embodiment, depending on the clock frequencies and buffer strengths, supply voltages of the respective components are scaled between a high level and a low level (at 112). In one embodiment, the high level is 1.8 VDC and the low level is 1.3 VDC.

In another embodiment, the high level is 14.0 VDC and the low level is 8.0 VDC.

In one embodiment, the graphics performances are scaled between a high level and a low level. The high level includes the 4×performance level under the Accelerated Graphics Port (AGP) Interface Specification developed by the Intel Corporation. The low level includes the 2×performance level under the AGP Specification. The 4×performance level requires higher minimum bus speeds and supply voltages than the 2×performance level. It is contemplated that in another embodiment, the low level includes the AGP Specification level 1×.

The present invention thus extends the scalability feature of Geyserville beyond the processor to various components across the computer 10 platform. By scaling to low levels various attributes of the components when a battery power source is utilized, power dissipation of the computer 10 is significantly reduced.

The SMC 12 next determines if all scaling operations have been successfully performed (at 114). In one embodiment, predefined registers including the model-specific registers (MSRs) or component ID registers are read to make that determination. The predefined registers may be updated by the components after the scaling operations have been successfully performed. If the scaling operations were successful, the SMC 12 removes the computer 10 from the Low Activity State (at 116).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

In addition, the methods as described above can be stored in memory of a computer system as a set of instructions to be executed. In addition, the instructions to perform the methods as described above could alternatively be stored on other forms of computer-readable mediums, including magnetic and optical disks. For example, the method of the present invention can be stored on computer-readable mediums, such as magnetic disks or optical disks that are accessible via a disk drive (or computer-readable medium drive).

What is claimed is:

1. A method including:
   detecting a power management event in a system that includes a change in a system power between an external power source and a battery source; and in response to the power management event, a system management controller multiplexes multiple management commands onto a system management bus in one signal for transmission to multiple system components to change settings of performance registers inside the system components, including dynamically adjusting a frequency of a processor clock, a memory subsystem clock, a clock generator, adjust a voltage supplied to the multiple system components, and a chipset buffer strength.

2. The method of claim 1, wherein a system chipset drives the system buses.

3. The method of claim 1, wherein the components include a memory subsystem and a graphics subsystem.

4. The method of claim 1, wherein the dynamically adjusting includes adjusting performance states of the plurality of system components between a high level and a low level.

5. The method of claim 4, wherein dynamically adjusting the performance states includes automatically placing the system in a deep sleep state upon the occurrence of the power management event to adjust the performance states of the system components.

6. The method of claim 1, wherein adjusting the performance state of a graphics subsystem includes selecting one predetermined level from two predetermined AGP Specification graphics performance levels.

7. A system comprising:
a detector adapted to detect generation of a power management event that includes a change in a system power between an external power source and a battery source; and
a controller, in response to the power management event, to multiplex multiple management commands onto a system management bus in one signal for transmission to multiple system components to change settings of performance registers inside the system components, including to dynamically adjust a frequency of a processor clock, a memory subsystem clock, a clock generator, adjust a voltage supplied to the multiple system components, and adjust a chipset buffer strength.

8. The system of claim 7, wherein a system chipset drives the system buses.

9. The system of claim 7, wherein the components include a memory subsystem and a graphics subsystem.

10. The system of claim 7, wherein the dynamically adjusting includes adjusting performance states of the plurality of system components between a high level and a low level.

11. The system of claim 10, wherein adjusting the performance state of a graphics subsystem includes selecting one predetermined level from two predetermined AGP Specification graphics performance levels.

12. The system of claim 10, wherein the low level is a deep sleep state.

13. A computer-readable medium having stored thereon a set of instructions to translate instructions, the set instructions, which when executed by a processor, cause the processor to perform a method comprising:
detecting a power management event that includes a change in a system power between an external power source and a battery source; and in response to detecting the power management event, a system management controller multiplexing multiple management commands onto a system management bus in one signal for transmission to multiple system components to change settings of performance registers inside the system components, including to dynamically adjust a frequency of a processor clock, a memory subsystem clock, a clock generator, adjust a voltage supplied to the multiple system components, and adjust a chipset buffer strength.

14. The computer-readable medium of claim 13, wherein a chipset drives the system buses.

15. The computer-readable medium of claim 13, wherein the components Currently Amended a memory subsystem and a graphics subsystem.

16. The computer-readable medium of claim 15, wherein the dynamically adjusting includes adjusting performance states of the plurality of system components between a high level and a low level.

17. The computer-readable medium of claim 16, wherein adjusting the performance state of a graphics subsystem includes selecting one predetermined level from two predetermined AGP Specification graphics performance levels.

18. The computer-readable medium of claim 16, wherein dynamically adjusting the performance states includes automatically placing the system in a deep sleep state upon the occurrence of the power management event to adjust the performance states of the system components.

* * * * *

UNITED STATES PATENT AND TRADEMARK OFFICE
CERTIFICATE OF CORRECTION

PATENT NO. : 7,085,944 B1  
APPLICATION NO. : 09/677261  
DATED : August 1, 2006  
INVENTOR(S) : Hamilton Page 1 of 1

It is certified that error appears in the above-identified patent and that said Letters Patent is hereby corrected as shown below:

In column 5, at line 9, after "and" insert --adjust--.

Signed and Sealed this

Eighth Day of April, 2008

JON W. DUDAS  
*Director of the United States Patent and Trademark Office*